US007139756B2

(12) United States Patent
Cooper et al.

(10) Patent No.: US 7,139,756 B2
(45) Date of Patent: Nov. 21, 2006

(54) SYSTEM AND METHOD FOR DETECTING DUPLICATE AND SIMILAR DOCUMENTS

(75) Inventors: James W. Cooper, Wilton, CT (US); Anni Coden, Riverdale, NY (US); Eric W. Brown, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 10/054,366

(22) Filed: Jan. 22, 2002

(65) Prior Publication Data

US 2003/0172066 A1    Sep. 11, 2003

(51) Int. Cl.
G06F 7/00    (2006.01)

(52) U.S. Cl. .................. 707/6; 707/7; 707/3

(58) Field of Classification Search .......... 707/4, 707/531, 101, 7, 203, 2, 5, 6, 102, 3, 100, 707/103; 380/23, 30

See application file for complete search history.

(56) References Cited

U.S. PATENT DOCUMENTS

| | | | |
|---|---|---|---|
| 4,993,068 A * | 2/1991 | Piosenka et al. | 713/186 |
| 5,913,208 A | 6/1999 | Brown et al. | 707/3 |
| 6,263,348 B1 * | 7/2001 | Kathrow et al. | 707/203 |
| 6,615,209 B1 * | 9/2003 | Gomes et al. | 707/5 |
| 6,658,423 B1 * | 12/2003 | Pugh et al. | 707/102 |

OTHER PUBLICATIONS

Cooper, J.W., "The Technology of Lexical Navigation," Workshop on Browsing Technology, First Joint conference on Digital Libraries, Roanoke, VA, 2001.

Cooper, J.W. et al, "OBIWAN—A Visual Interface for Prompted Query Refinement," HICCS-31; 1998.

Ravin, Y. et al, "Extracting Names from Natural-Language Text," IBM Research Report 20338; Jan. 16, 1996.

Cooper, J.W. et al, "Lexical navigation: Visually Prompted Query Expansion and Refinement," IBM Research Report 20874; May 1, 1997.

Neff, M.S. et al., "A Document Summarization for Active Markup" Proceedings of the 32nd Hawaii International Conference on System Sciences, Jan. 1999.

* cited by examiner

Primary Examiner—Sam Rimell
Assistant Examiner—Jacob F. Bétit
(74) Attorney, Agent, or Firm—Anne V. Dougherty; Harrington & Smith, LLP

(57) ABSTRACT

A system and a method are described for rapidly determining document similarity among a set of documents, such as a set of documents obtained from an information retrieval (IR) system. A ranked list of the most important terms in each document is obtained using a phrase recognizer system. The list is stored in a database and is used to compute document similarity with a simple database query. If the number of terms found to not be contained in both documents is less than some predetermined threshold compared to the total number of terms in the document, these documents are determined to be very similar. It is shown that these techniques may be employed to accurately recognize that documents, that have been revised to contain parts of other documents, are still closely related to the original document. These teachings further provide for the computation of a document signature that can then be used to make a rapid comparison between documents that are likely to be identical.

33 Claims, 5 Drawing Sheets

SYSTEM AND METHOD FOR DETECTING DUPLICATE AND SIMILAR DOCUMENTS

TECHNICAL FIELD

These teachings relate generally to information retrieval systems and methods and, more specifically, relate to systems and methods for comparing documents one to another. Even more specifically, these teachings relate to digital libraries of documents, and more particularly relate to the search and retrieval of documents relevant to a query, and to techniques to detect that some of the documents are identical, or very nearly identical.

BACKGROUND

Regardless of the search technology that is employed, most conventional search systems follow the same basic procedure for indexing and searching a database in a digital library. First, the data to be searched must be input to the search system for indexing. Next, attributes or contents or both are extracted from the objects and processed to create an index. An index contains data that is used by the search system to process queries and identify relevant objects. After the index is created, queries may be submitted to the search system. The query represents information needed by the user and is expressed using a query language and syntax defined by the search system. The search system processes the query using the index data for the database and a suitable similarity ranking algorithm. From this, the system returns a list of topically relevant objects, often referred to as a Ahit-list@ The user may then select relevant objects from the hit-list for viewing and processing.

A user may also use objects on the hit-list as navigational starting points. Navigation is the process of moving from one hypermedia object to another hypermedia object by traversing a hyperlink pointer between the objects. This operation is typically facilitated by a user interface that displays hypermedia objects, highlights the hyperlinks in those objects, and provides a simple mechanism for traversing a hyperlink and displaying the referent object. One such user interface is a Web browser. By navigating from one object to another, a user may find other objects of interest.

In a network environment, the components of a text search system may be distributed across multiple computers. A network environment includes as a minimum two or more computers connected by a local or wide area network, (e.g., Ethernet, the telephone network, and the Internet). A user accesses the hypermedia object database using a client application on the user=s computer. The client application communicates with a search server (e.g., a hypermedia object database search system) on either the computer (e.g., the client) or another computer (e.g., one or more servers) on the network. To process queries, the search server needs to access just the database index, which may be located on the same computer as the search server or yet another computer on the network. The actual objects in the database may be located on any computer on the network. These types of systems and search processes are all well known in the computing and database arts.

A Web environment, such as the World Wide Web (WWW) on the Internet, is a network environment where Web servers and browsers are used. Having gathered and indexed all of the documents available in the collection, the index can then be used, as described above, to search for documents in the collection. Again, the index may be located independently of the objects, the client, and even the search server. A hit-list, generated as the result of searching the index, typically identifies the locations and titles of the relevant documents in the collection, and the user may then retrieve those documents directly with the user=s Web browser.

One of the continuing problems in information retrieval is related to the fact that in the Web environment, there are a large number of near-duplicate documents returned from most searches. A number of methods have been proposed for recognizing and eliminating such duplicates.

For example, Eric W. Brown and John M. Prager in U.S. Pat. No. 5,913,208 note that documents having identical metadata such as size, date, and base filename are likely to be copies kept on different directories or on different servers, and can effectively be reduced to one single occurrence.

Another system was described by Andrei Z. Broder, AIdentifying and Filtering Near-duplicate Documents,@ Combinatorial Pattern Matching, $11^{th}$ Annual Symposium, Montreal, Canada, June, 2000., in which regions of each document, called Ashingles@, are each treated as a sequence of tokens and then reduced to a numerical representation. These are then converted to Afingerprints@ using a method originally described by M. O. Rabin, AFingerprinting by random polynomials", Center for Research in Computing Technology, Harvard University, Report TR-15-81, 1981.

At an even more simplistic level, an algorithm has been described for detecting plagiarism in which one simply searches for matches of six or more successive words between two documents.

As should be apparent, a need exists to provide an accurate and efficient algorithm and system for determining a degree of likeness between electronically represented documents.

DETAILED DESCRIPTION OF THE PREFERRED EMBODIMENTS

The foregoing and other problems are overcome, and other advantages are realized, in accordance with the presently preferred embodiments of these teachings.

Described herein is a system and a method of computing whether two documents are identical, or very similar, based on a similarity between lists of terms and possibly phrases found in common between the two documents. If the lists of terms are identical, the documents can be considered identical. If the lists are very nearly identical, the documents are considered to be closely related. These teachings also pertain to a single numerical document signature that can be used for rapid comparison of longer documents. These teachings are also directed to a technique to recognize documents which are revisions of other documents, i.e., those which contain new material but which also contain much of the original document.

A system and a method are described for rapidly determining document similarity among a set of documents, such as a set of documents obtained from an information retrieval (IR) system. A ranked list of the most important terms in each document is obtained using a phrase recognizer system. The list is stored in a database and is used to compute document similarity with a simple database query. If the number of terms found to not be contained in both documents is less than some predetermined threshold compared to the total number of terms in the document, these documents are determined to be very similar. It is shown that these techniques may be employed to accurately recognize that documents, that have been revised to contain parts of other documents, are still closely related to the original document. These teachings further provide for the computation of a document signature that can then be used to make a rapid comparison between documents that are likely to be identical.

Disclosed herein is a system and method that detects duplicate and very similar documents by comparing the number of similar terms in each document, and that detects very similar documents by comparing the number of similar terms in each document. The system and method computes document signatures using a sum of hash codes of the terms found in documents, and detects duplicate documents by comparing the document signatures. The system and method detects documents having much similar content, such as documents that are revisions of each other, by comparing the number of similar terms in each document.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
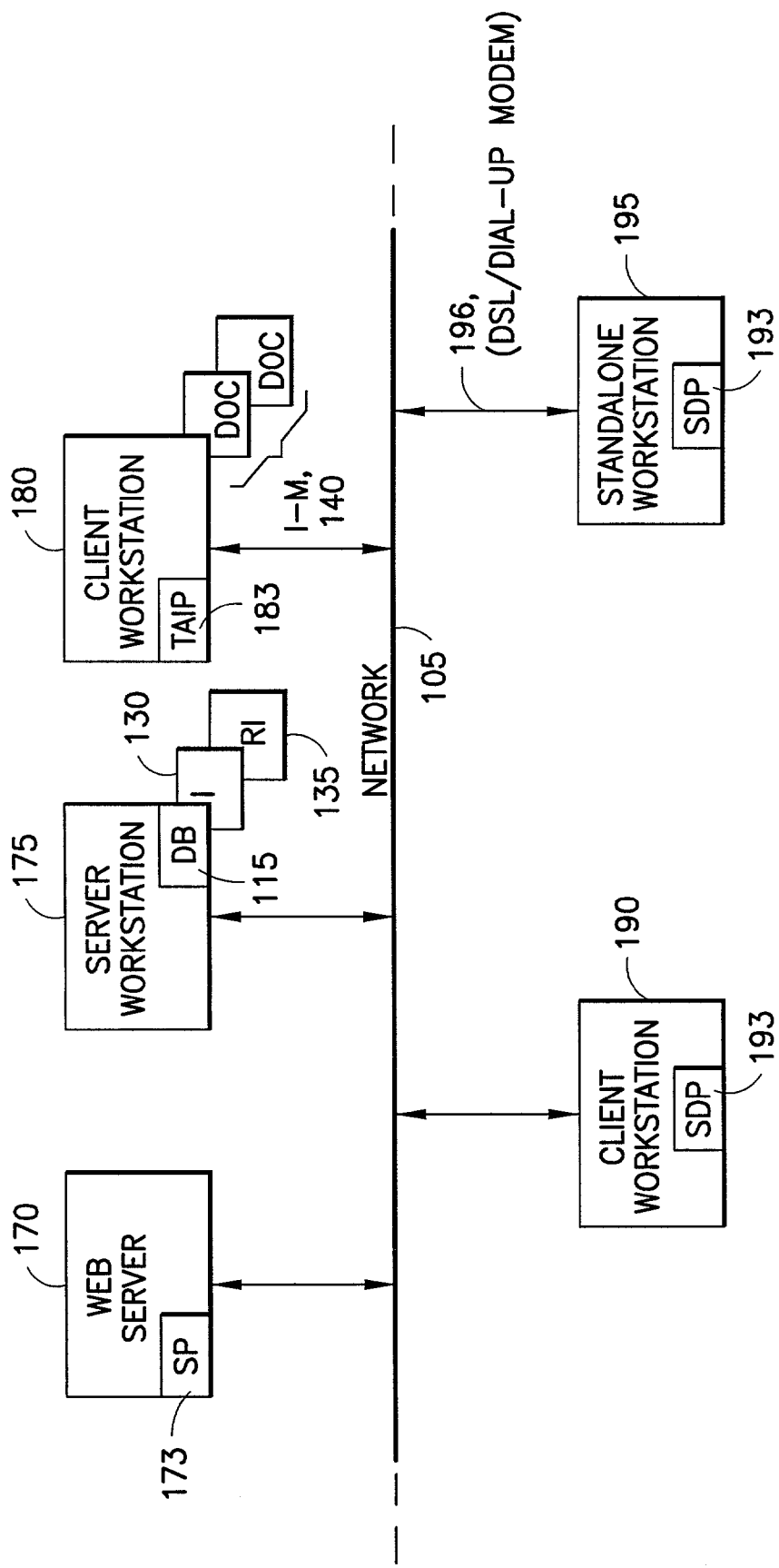
FIG. 1 is a block diagram of a networked search system in accordance with one embodiment of these teachings.

FIG. 1 illustrates an exemplary networked search system 100 that may be used when searching, analyzing and displaying text documents in accordance with the teachings herein. The exemplary networked search system 100 includes a Web server 170, a server workstation 175, a client workstation 180, a client workstation 190, and a stand-alone workstation 195, all interconnected through network 105. The Web server 170 executes a server program (SP) 173. The server workstation 175 includes a database (DB) 115 that may contain or be associated with an index (I) 130 and a relations index (RI) 135. The client workstation 180 includes a transcript analysis and indexing process (TAIP) 183 and documents (Docs) 1 through M. The database 115 includes the index 130, the relations index 135 and documents 140. Client workstation 190 and stand-alone workstation 195 each include search and display processes (SDP) 193.

The network 105 may be a local area network (LAN), a wide area network (WAN), the Internet, or a combination of the foregoing. Moreover, some of the computers and workstations in this environment may support the Web information exchange protocol (e.g., HyperText Transmission Protocol or HTTP) and be part of a local Web or the World Wide Web (WWW). Some computers may be occasionally connected to the network 105 and operate as stand-alone computers. For example, stand-alone workstation 195 connects to network 105 through an intermittent connection 196 that is, for example, a Digital Subscriber Line (DSL) or a dial-up modem.

The example of FIG. 1 shows two separate tools that are most germane to an understanding of these teachings. These tools are the transcript analysis and indexing process 183 and the search and display process 193.

The transcript analysis and indexing process 183, using additional tools not shown in FIG. 1 but described below, operates to determine salient terms in a document and processes the documents. For the purposes of this description a salient term is a single word or a multi-word term that meets a predetermined confidence. Briefly, the transcript analysis and indexing process 183 uses a tool to select high confidence single word and multi-word terms from processed text documents. From these high confidence terms, an additional level of scrutiny is performed to select the salient terms.

Once the salient terms are determined, the transcript analysis and indexing process 183 creates the relations index 135 from the salient terms and index 130 from the documents. Relations index 135 represents the relationships between terms in the salient terms, while index 130 represents the relationships between documents. In one embodiment, the system 100 has a workstation 185 containing a collection of documents 140 and corresponding indexes 130, 135. In another embodiment the system 100 has the workstation 175 which contains only the indexes 130 and 135 to the documents 140.

Both of these embodiments utilize the search engine 120 to search these indices. A user can employ the search and display process 193 and may enter query search terms. In one embodiment, the system 100 also uses the Web server computer 170 that provides a means for viewing the documents 140, links between them, query search terms, and results. The search and display process 193 communicates with server program 173, which sends requests to relationships query engine 125 and to the search engine 120. A user is enabled to use the search and display process 193 to search, by entering query terms, for relevant documents 188, and the user can select an appropriate document for display.

Figure 2:
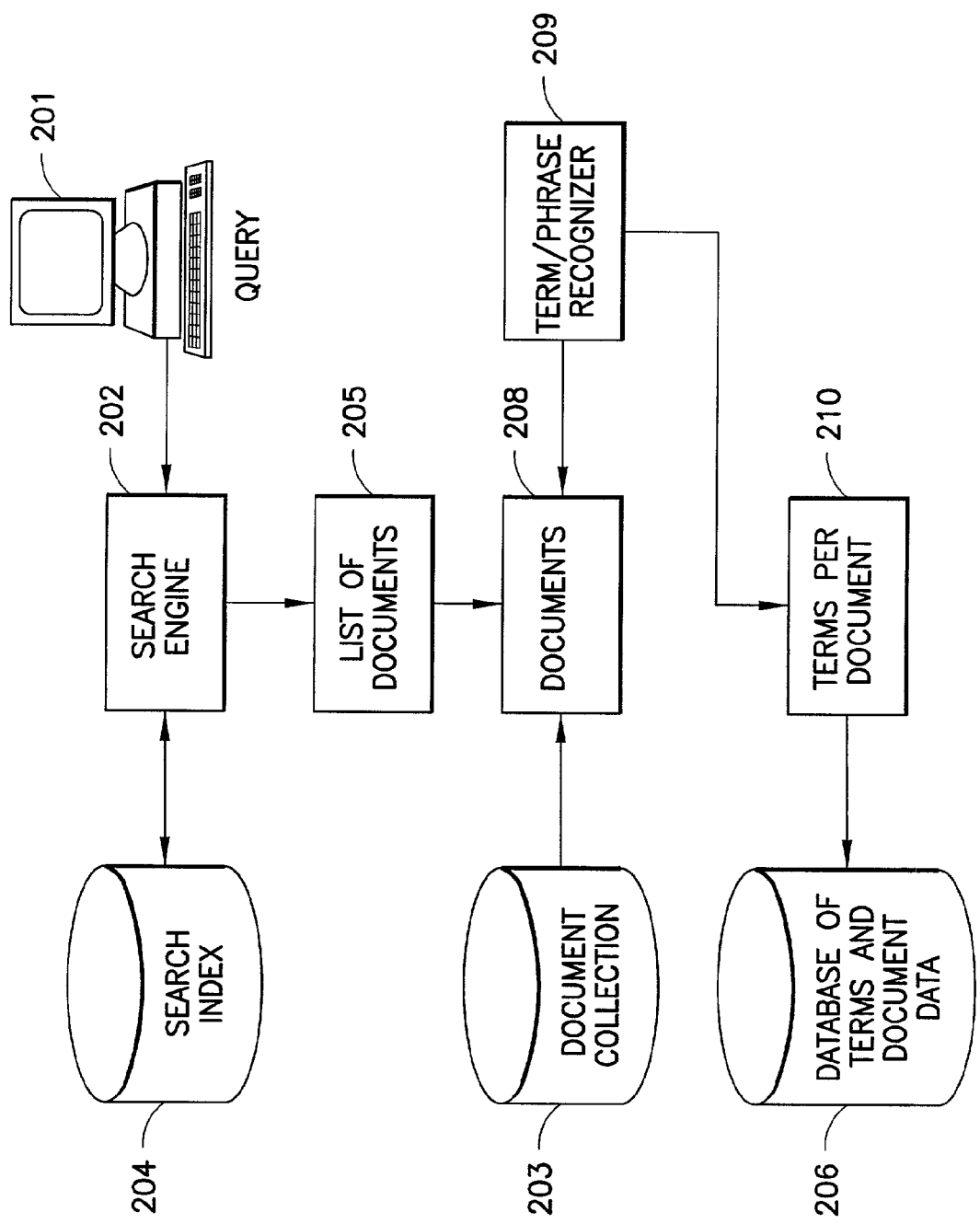
FIG. 2 is a flowchart illustrating how a query returns documents and how terms are recognized and stored in a database.

FIG. 2 illustrates a workstation 201 where a query can be entered by the user. The query is sent over a network, such as the network 105, to the search engine 202 that looks up the query word(s) in the search index 204 and returns a list of documents 205. Copies of the actual documents 208 are then obtained from the document collection 203. A term-phrase recognition program 209, such as one known as Textract that is described in greater detail below, is applied to the documents, resulting in a list of the major, salient terms in each document 210, which are then stored in a database 206 for rapid retrieval.

Figure 3:
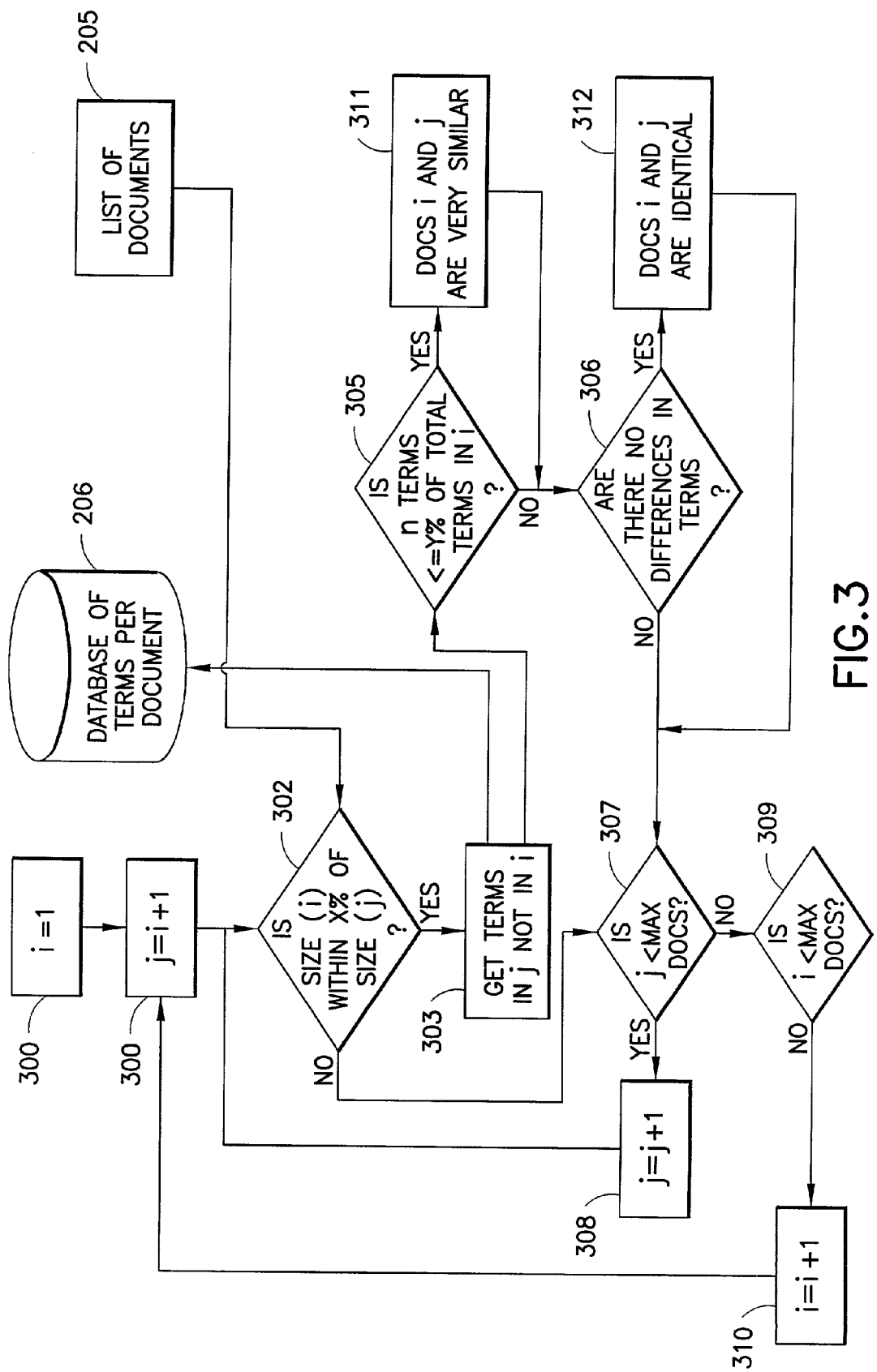
FIG. 3 is a flowchart illustrating how documents are compared for identity and close similarity.

FIG. 3 illustrates a method for comparing documents to discover if they are identical or very similar. The software program starts with a list of the documents 205 that are returned from a search ordered by increasing document size. The method begins by initializing two indices I and j (steps 301, 302) and then performs a test to determine if the documents are within X % of the same size. In this embodiment a value of 10% is used for X, while in other embodiments other values may be used. If the sizes are similar (i.e., within X % of one another), a database SELECT query (step 303) is issued against the database of terms per document 206 to obtain a list of the terms in document j that are not in document i. If the number of terms not in document I is less than Y % of the total number of terms in document I(step 305) the method flags this document j as being very similar to I(step 311). If there are no terms different between the documents, the method marks the documents as being identical at step 312. This process repeats for all documents larger than document I (step 307) and for all remaining documents (step 308). The result is a table of all documents that are identical and all documents that are very similar.

Figure 4:
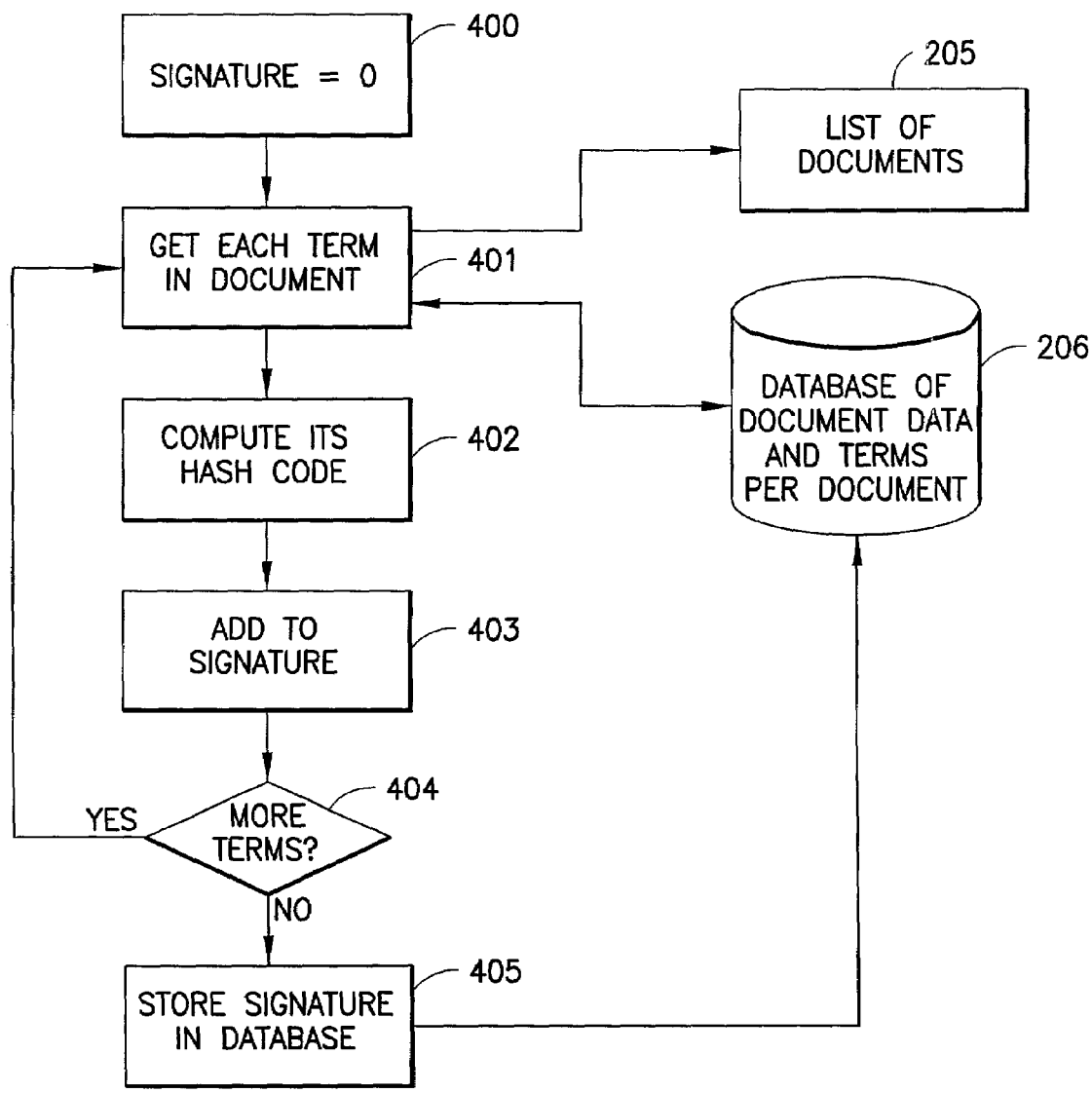
FIG. 4 is a flowchart that depicts a process for computing a document signature.

FIG. 4 shows a flowchart of a method for computing a signature for each document. For each document in the list of documents 205, the method obtains the major terms from the database 206. For each term (step 401) a standard function (step 402) is used (such as the getHashcode method known from Java) to compute a hash code for the corresponding character string. The hash codes are added together at step 403 for all terms producing an integer signature for that document. This signature code is then stored at step 405 back into the database 206.

Figure 5:
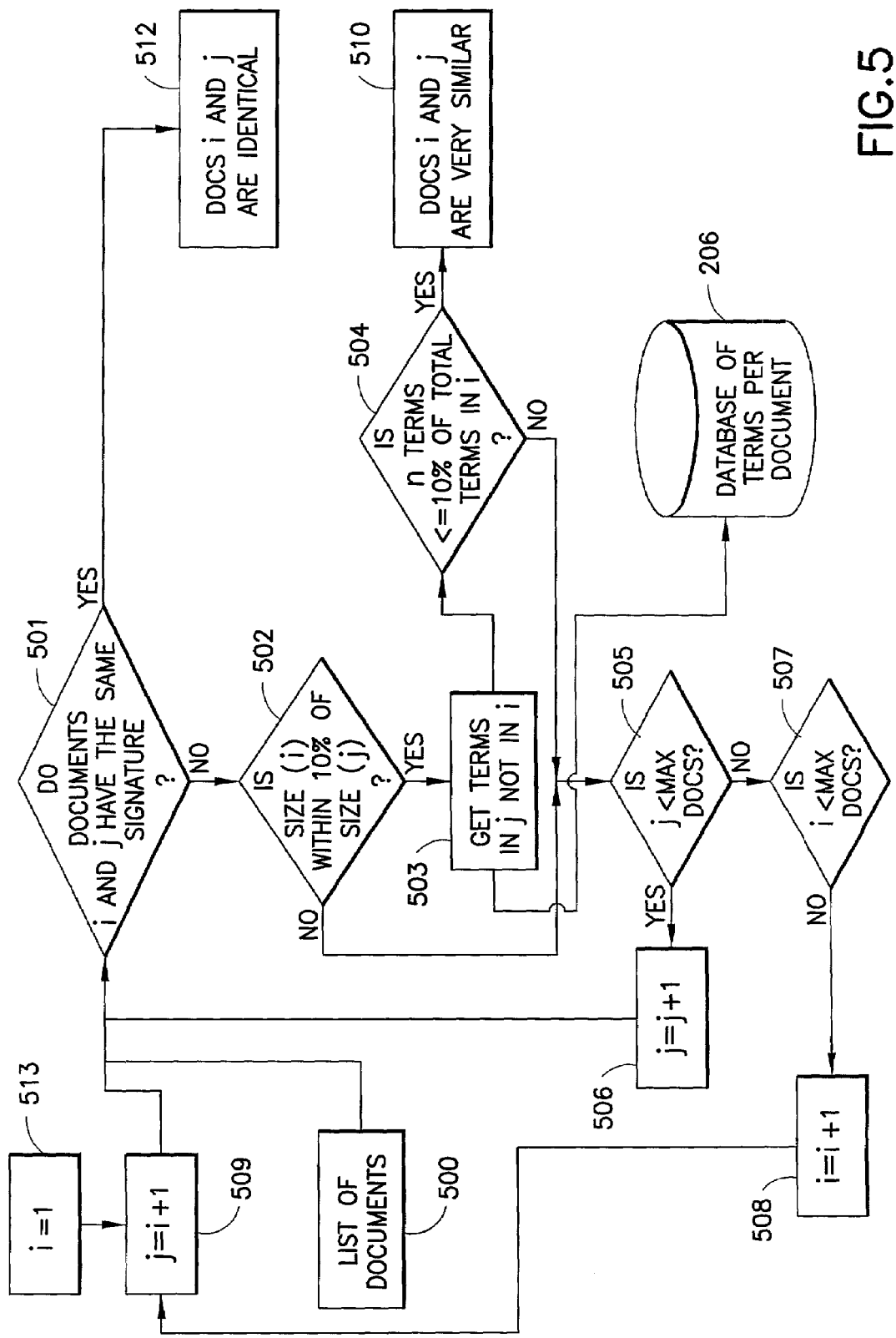
FIG. 5 illustrates a flowchart of a process for comparing documents for identity using a signature, and then for close similarity.

FIG. 5 shows a method for comparing documents to discover if they are identical or very similar, using the document signatures that were stored at step 405 of FIG. 4. The software program starts at step 500 with the list of the documents 205 that are returned from a search ordered by increasing document size. The method begins with two indexes I and j (steps 509, 513) and checks at step 501 to determine if the document signatures match. If they do, the documents are declared to be identical at step 512. If the signatures do not match, the next step 502 of the method checks to determine if the documents are within X % of the same size. In this (non-limiting) embodiment, a value of 10% is used for X. If the sizes are similar, a database SELECT query (step 503) is issued against the database of terms per document 206 to obtain a list of the terms in document j that are not in document i. If the number of terms not in document j is less than Y % of the total number of terms in document I (step 504) the document j is flagged as being very similar to I (step 510). This process repeats for all documents larger than document I (steps 505, 506) and for all remaining documents (steps 507, 509). The result is a table of all documents that are identical and all documents that are very similar.

It should be apparent that these teachings provide a system and method for detecting documents returned from a search that are identical or very nearly identical. These teachings also provide a method of determining a document signature to allow more rapid comparison of documents, and a method for locating documents that are similar (e.g., documents that are revisions of other documents but that contain new or different material).

The method uses sophisticated, but fast, term recognition software to characterize documents by a list of the major, salient terms in each of the documents. When a search is performed, the terms in the returned documents can either be recognized rapidly, as described in FIG. 2, or these terms can be precomputed when the documents are indexed for retrieval and stored in the same database. Two documents are identical if they have all of the major terms identical, and very nearly identical if the number of different terms is less than some threshold value, such as 10%, of the total number of terms. A first document may be declared to be substantially identical to, or substantially similar to, a second document if some predetermined number of terms are found in both the first document and the second document. For example, if the predetermined number is about 90% of the terms or greater, the first document is declared to be substantially identical to the second document.

An important aspect of these teachings is that after the terms are recognized a very simple and fast database query can be used to return a list of all the terms which two documents do not have in common. The database can be any relational database, and may store the data in any convenient form either in memory or in standard database tables.

In another embodiment the terms are recognized in advance at indexing time for each document, and a hash code is computed for each term. The sum of these hash codes constitutes a document signature that is sufficiently unique to use as a comparison among documents returned from a query. In this embodiment the signatures of the documents are compared first, without reference to the document=s size or list of terms, and if the signatures agree, the documents are deemed identical. If the signatures do not agree, the same computations are performed as described above to determine whether the documents are very nearly identical.

These teachings can also be used to recognize documents that are similar by virtue of being revisions of each other. In this embodiment, the variables X % and Y % described in FIG. 3 are made larger. It is possible to recognize documents whose size varies by as much as, for example, 25% and whose term lists differ by as much as, for example, 40% in size, and still determine that these documents are closely related.

Having thus provided a description of the system and methods in accordance with these teachings a further, more detailed description is now provided of the various text analysis and processing tools and procedures that were mentioned above.

More specifically, these teachings provide for characterizing documents in accordance with the major terms discovered in them using phrase recognition software. These teachings generally operate on the hypothesis that documents having identical lists of discovered terms are effectively identical in content.

In a presently preferred, but not limiting embodiment a suite of text analysis tools collectively known as Talent (Text Analysis and Language Engineering Tools) are employed for analyzing documents in a collection of documents.

The presently preferred primary tool for analyzing documents is the above-mentioned Textract, which is itself a chain of tools for recognizing multi-word terms and proper names. The features of Textract have been described by J. W. Cooper and R. J. Byrd, ALexical Navigation: Visually Prompted Query Refinement,@ ACM Digital Libraries Conference, Philadelphia, 1997 and by J. W. Cooper and R. J. Byrd, OBIWAN B AA Visual Interface for Prompted Query Refinement,@ Proceedings of HICSS-31, Kona, Hawaii, 1998, both of which are incorporated by reference herein. In general, Textract recognizes named entities, multi-word terms and named and unnamed relations between terms. Further reference in this regard can be had to Y. Ravin and N. Wacholder, AExtracting Names from Natural-Language Text,@ IBM Research Report 20338; J. S. Justeson and S. Katz "Technical terminology: some linguistic properties and an algorithm for identification in text.@ Natural Language Engineering, 1, 9–27, 1995; and R. J. Byrd. and Y. Ravin, AIdentifying and Extracting Relations in Text@, Proceedings of NLDB 99, Klagenfurt, Austria.

Textract reduces related forms of a term to a single canonical form that it can then use in computing term occurrence statistics more accurately. In addition, it recognizes abbreviations and finds the canonical forms of the words they stand for, and aggregates these terms into a vocabulary for the entire collection, and for each document, keeping both document and collection-level statistics on these terms. Each term is given a collection-level importance ranking called the IQ or Information Quotient (see, in this regard, J. W. Cooper and R. J. Byrd, ALexical Navigation:

Visually Prompted Query Refinement,@ ACM Digital Libraries Conference, Philadelphia, 1997, and J. M. Prager, ALinguini: Recognition of Language in Digital Documents@, in Proceedings of the 32$^{nd}$ Hawaii International Conference on System Sciences, Wailea, Hi., January, 1999.

The IQ is effectively a measure of the document selectivity of a particular term: a term that appears in only a few documents is highly selective and has a high IQ. On the other hand, a term that appears in many documents is far less selective and has a low IQ. The IQ is measured on a scale of 0 to 100, where a value of X means that X % of the vocabulary items in the collection have a lower IQ. The IQ measure is based on the number of occurrences of a term in a collection, the number of documents the term occurs in and the number documents the term occurs in more than once. Thus, the value of the IQ is collection dependent and a term (such as Acomputer@) that is salient in a collection of documents about entertainment may have a very low IQ in a collection of documents about computer technology.

Two of the major outputs of Textract are the IQ and the collection statistics for each of the canonical terms, and tables of the terms found in each document. The terms per document are not canonical forms, since this information is generated during a second pass. It is these document-level terms that are of most significance to these teachings. Textract further categorizes the entities it discovers into one of the categories shown in Table 1. The earlier categories have the least certainty and the later ones higher certainty.

TABLE 1

Categories assigned to terms by Textract

| | |
|---|---|
| UWORD | Unknown word |
| UTERM | Unknown term |
| UABBR | Unknown abbreviation |
| UNAME | Unknown type of name |
| PLACE? | Probably a place |
| PERSON? | Probably a person |
| PLACE | A place |
| PERSON | A person |
| ORG | An organization |

While Textract is the presently preferred phrase recognition tool, it is noted that there are a number of other systems that have been developed for phrase recognition. For example, two other suitable phrase recognition systems are one known as DR-LINK(™), (Mnis-Textwise Labs, www.textwise.com), and LinkIT(™), (D. K. Evans, J. Klavans and N. Wacholder, ADocument Processing with LinkIT,@ Proc. of the RIAO Conference, Paris, France, 2000).

The Textract system has been previously employed to characterize documents in a number of ways. For example, Textract=s term recognition combined with conventional tf*idf term frequency measures and some document structure information have been used to help generate useful summaries of documents, as reported by M. S. Neff and J. W. Cooper, ADocument Summarization for Active Markup,@ in Proceedings of the 32$^{nd}$ Hawaii International Conference on System Sciences, Wailea, Hi., Jan., 1999.

In a similar fashion, it has been reported that one could characterize documents of little significant content using the measures generated by Textract, and then eliminate them from lists of results returned from searches. Reference in this regard can be had to J. W. Cooper and J. M. Prager, AAnti-Serendipity B Finding Useless Documents and Similar Documents,@ Proceedings of the 33rd Hawaii International Conference on System Sciences, Maui, Hi., Jan., 2000.

Once the data from a collection of documents have been analyzed using Textract, it is useful to construct a system for managing that data in a way that facilitates sorting the terms by document, by IQ and by term type. For this purpose, it is preferred to construct a Java class library known as KSS (Knowledge System Server), which builds a database from the Textract data. Reference in this regard can be made to J. W. Cooper, AThe Technology of Lexical Navigation,@ Workshop on Browsing Technology, First Joint Conference on Digital Libraries, Roanoke, Va., 2001, and to J. W. Cooper, C. Cesar, E. So and R. L. Mack, AConstruction of an OO Framework for Text Mining,@ OOPSLA, Tampa Bay, 2001. These classes can be used to create search engine indexes of the documents, and to build the context thesaurus of co-occurring terms, as described by J. W. Cooper and R. J. Byrd, ALexical Navigation: Visually Prompted Query Refinement,@ ACM Digital Libraries Conference, Philadelphia, 1997.

In any Web search, it is likely that some documents that are returned are very similar. For example, the same documents may exist on several servers or in several users=directories. One very frequent example of this are the Java API documents which are found on many Java-based developer=s machines. Since these are very well known and described, they are readily eliminated using any one of a number of existing techniques.

However, more difficult cases occur when there are several versions of the same document on various servers, or the same document is found in several forms, such as HTML and PDF, or when one document is embedded in another. In this case the embedded document may or may not be the most significant part of the combined document.

These cases are more difficult to solve rapidly, and it is these cases that are particularly amenable to being processed by the system and methods in accordance with these teachings.

Duplicate documents may be defined as those that have essentially the same words in the same sentences and paragraphs. The paragraphs could be in a somewhat different order, however. The documents may be in different forms, such as HTML and PDF, and they may vary slightly in header information.

A feature of these teachings is the realization by the inventors that it is possible to use some subset of terms found by Textract (or some other suitable text analysis system) as a compressed document representation, which can be employed to make rapid comparisons of documents and to cluster or eliminate those that are essentially identical.

EXAMPLE 1

Query 1

In a first experiment a popular search engine site was accessed, with all enhancements turned off, and the query Afix broken Thinkpad@ was issued (AThinkpad@ is a registered trademark of the International Business Machines Corporation). This is the type of naive query that returns a plethora of documents the user does not want or expect. The result was that there were no documents returned on how to repair a Thinkpad(™). However, many of the top 50 documents contained all of these terms in some context or other. Of the top 50, 36 could be downloaded and analyzed. Ten of these documents were Adobe Acrobat(™) PDF files, and a Gemini(™) plug-in for the Adobe Acrobat(™) reader was used to export these files into HTML.

A single collection of these documents was then assembled and analyzed using Textract. Textract produced a file of terms found in each document, and a file of all the terms in the collection along with their IQ. The KSS Java libraries were used to load these result files into a database (DB2(tm)) and these result files were subjected to various SQL queries to determine the number of terms that the downloaded documents had in common.

In accordance with this procedure one first finds the significant terms in each document. Initially, all of the terms were ranked (except the unknown word types) in order of decreasing IQ, and then filtered to eliminate those terms which only appear once in the collection, that is, those that have a frequency of 1.

The next question to answer is which terms are not found in common between pairs of documents. This can be accomplished with a single SQL query of the sort:

Select count(*) as c from (select terms from doc1 where . . . )

not in (select terms from doc2 where . . . )

It was determined that an important selection criteria is to select terms with an IQ>0, and which were not UWORDS (unknown words). The requirement of terms having a greater frequency than 1 was not used in this example, since this was found to make the comparisons of shorter documents less accurate.

What was returned was the count of the number of terms that appear in document 2 that are not in document 1. While it might appear that $n^2$ queries are necessary to accomplish this, it is in fact only necessary to traverse the upper triangle of this matrix. This is accomplished by sorting the documents into order of increasing size, and comparing the documents with the next larger ones in the list. The number of compares may be further reduced by limiting the test to documents that are no more than 10% larger than the compared document.

The results obtained indicated that six clusters of documents existed in the 36 documents that were analyzed in the first query. Three of these clusters were pairs of identical documents returned from different servers, as shown in Table 2. These documents are identical by any measure and can be easily recognized and collapsed to a single entity.

TABLE 2

Identical Documents returned by Query 1

| Document name | Size | # of terms |
|---|---|---|
| Sytpf130.html | 12236 | 122 |
| Sytpf1301.html | 12236 | 122 |
| aixy2k.html | 153255 | 737 |
| aixy2k1.html | 153255 | 737 |
| Client.html | 52854 | 189 |
| Conf.html | 52854 | 189 |

Table 3 shows a cluster of eight documents which have similar names, but different sizes. The final column of the table shows the difference in contained terms between adjacent documents in the list.

TABLE 3

Very Similar Documents returned from Query 1

| Number | Title | Size | Terms | Delta terms |
|---|---|---|---|---|
| 1 | Fund2 | 481963 | 2198 | 0 |
| 2 | Fund4 | 481963 | 2207 | 29 |
| 3 | ct7mhna1 | 493225 | 2139 | 0 |
| 4 | Ct7mhna2 | 493295 | 2146 | 64 |
| 5 | Fund0 | 503138 | 2235 | 37 |
| 6 | Fund1 | 504737 | 2249 | 25 |
| 7 | Fund3 | 505004 | 2287 | 11 |
| 8 | Fund5 | 505471 | 2271 | — |

One can readily see that these documents must be closely related versions of the same information. In fact, they are all different versions of the same IBM manual describing a Websphere(™) server product. The documents differ only in small details: for example one manual mentions the Linux version of Websphere(™) and another does not. Each of these documents was returned as a PDF file and was converted to HTML using the Gemini(™) plug-in mentioned above. In Table 3, documents 1 and 2 and documents 3 and 4 are almost certainly absolutely identical. However, the remaining four documents are clearly all closely similar as well. This algorithm finds such documents even when relatively simpler methods would not.

It is noted that one may remove a document from the cluster of very similar documents if the terms that are different between them include a term that is also contained in the original query.

The search also returned two other closely related document pairs as shown in Table 4. Documents 9 and 10 are in fact a draft and a final PDF document of the same technical paper. Since these papers are quite different in size and format, they would probably not have been found as similar by conventional techniques. Documents 11 and 12 in Table 4 are much less closely related by inspection, although the number of terms they have in common is quite high. These are in a false match that was generated by eliminating both unknown words and unknown names from the comparison. Both documents are, in fact, articles about software updates for Thinkpads(™), but one is concerned with video features for Windows(™) 3.1 on a Thinkpad 380 and 600, and the other with the latest video driver for OS/2(™) for the same two machines. If one does not exclude unknown names (which in this case are part and model numbers) the documents are not suggested as being similar.

TABLE 4

Pairs of Similar Documents returned by Query 1

| Number | Title | Size | Terms | Delta |
|---|---|---|---|---|
| 9 | Selker3.htm | 50169 | 257 | 23 |
| 10 | Selker.htm | 54274 | 218 | — |
| 11 | Manager.htm | 15903 | 91 | 8 |
| 12 | Manager1.htm | 16000 | 80 | — |

When documents are very large, it is not usually convenient to run phrase recognition software on the entire set of documents in real time when they are returned from a query. However, as part of the indexing process, it is not unreasonable to catalog the major terms in each document. However, even making comparisons among large numbers of terms in multiple documents can take many seconds and can lead to unacceptable delays in returning answers.

This problem is overcome, as described above, by computing the digital signature of each document, based on the terms found in the document. Such a signature can be as simple as a sum of the hash codes of the term strings that make up these major terms. As was discussed above, it is preferred to use the Java String class=s hashCode method to compute a code for each term found in a document, and to then sum the codes to form the signature. The results are shown in Table 5. The number suffixes are used to indicate identical url names from different servers.

TABLE 5

Computed document signatures for similar documents from Query 1.

| Number | Url | Size | Signature |
|---|---|---|---|
| 1 | Fund2 | 481963 | 24681058826 |
| 2 | Fund4 | 481963 | 26371644438 |
| 3 | Ct7mhna1 | 493225 | 33130506660 |
| 4 | Ct7mhna2 | 493295 | 32920545738 |
| 5 | Fund0 | 503138 | 10451017932 |
| 6 | Fund1 | 504737 | 8933271588 |
| 7 | Fund3 | 505004 | 7211814280 |
| 8 | Fund5 | 505471 | 12114748848 |
| 13 | Sytpfl30 | 12236 | 13802917585 |
| 14 | Sytpfl301 | 12236 | 13802917585 |
| 15 | aixy2k | 153255 | −28232730155 |
| 16 | aixy2k1 | 153255 | −28232730155 |
| 17 | Client | 52854 | 6580188642 |
| 18 | Conf | 52854 | 6580188642 |

Examining Table 5, it is clear that even though documents 1 and 2 and documents 3 and 4 have similar names and identical sizes, they are not exactly the same, since the signatures differ. On the other hand, documents 13 and 14 are identical, as are documents 15 and 16 and documents 17 and 18. To validate the results of this computation, a query was run to find which terms actually appear in document 2 that do not appear in document 1. These are shown in Table 6.

TABLE 6

Terms found in Document 2 but not in Document 1

Current information
Database cleanup utility
Marketing campaign
PDF document
Product attribute
Shopper request Note that two documents could be considered identical by this procedure if they contained the same paragraphs in a different order, or even the same sentences in a different order. While it is possible to measure this as well, it is not generally desired as the document comparison is made more cumbersome and requires more time to execute.

It should be further noted that while individual strings usually have unique hash codes, there is a somewhat larger probability that the sum of a series of hash codes will be less unique. However, the probability of these collisions is small enough that these document signatures remain quite useful. Further, it is even less likely that documents with accidentally identical signatures would be returned from a query if they were not the same document.

EXAMPLE 2

Query 2

In a second series of experiments, a more focused query AProgram ViaVoice in Java@ was issued, and 47 of the top 50 returned documents were able to be retrieved (ViaVoice is a registered trademark of the International Business Machines Corporation). Since many of these documents had the same filename, they were carefully renamed when local copies were saved for analysis.

Since all of these documents were of modest size (the largest one was only 75 Kbytes), it was found that one could perform the entire analysis on the documents quickly enough that the analysis could be carried out more or less in real time in response to a query.

The results included eight pairs of identical documents, as measured by size and the signature process described above. In addition, the results contained the 13 very similar documents shown in Table 7.

TABLE 7

Very Similar Documents Returned by Query 2

| # | # Terms | delta | Url | Size | Signature |
|---|---|---|---|---|---|
| 23 | 47 | 1 | News11 | 37788 | −9902679640 |
| 32 | 47 | 1 | News9 | 38100 | −9692972733 |
| 28 | 48 | 0 | News5 | 38383 | −11688727862 |
| 24 | 47 | 1 | News12 | 38604 | −9692972733 |
| 31 | 48 | 0 | News8 | 38727 | −9921821918 |
| 25 | 47 | 0 | News2 | 39389 | −9692972733 |
| 29 | 47 | 0 | News6 | 39389 | −9692972733 |
| 26 | 47 | 0 | News3 | 39465 | −9692972733 |
| 27 | 47 | 1 | News4 | 39465 | −9692972733 |
| 19 | 46 | 1 | News0 | 39580 | −5116033555 |
| 21 | 46 | 3 | News1 | 39580 | −8166342237 |
| 22 | 47 | 1 | News10 | 40537 | −11188846377 |
| 30 | 48 | — | News7 | 40537 | −12715476873 |

The documents in Table 7 are all very similar, since they differ in only one or two terms out of 47, and all have similar sizes. Based on size alone, one would identify only four pairs of identical documents. However, all of these are detected as similar based on the fact that they contain the same terms. In addition, it is significant that six of these documents have identical signatures (shown in boldface) even though they are of four different sizes. This illustrates the utility of the signature method for rapid identification of documents. For any new document, one may compute its signature and quickly compare it with other document signatures. If it is identical, one may then also compute whether these documents contain similar terms.

In the foregoing the problem of finding very similar documents was discussed, where in most cases the documents are so similar that only one of them need be returned from a search. However, there is another set of problems to solve that relate to documents that are similar because they exist in a number of revisions. In order to apply these teachings to this type of problem it may be desirable to relax the restrictions regarding the percentage of terms that could be different, and the size differences allowed between documents that are compared.

EXAMPLE 3

In one experiment 13 documents were collected about IBM financial and banking products and services from the ibm.com web site, so that they would all have a relatively similar vocabulary, and one document which was a press release about IBM=s performance in a supercomputer comparison. It was expected that this last document would have a markedly different vocabulary from the other 13. The supercomputer document was processed to cut out a 2533 byte segment comprising the main news story, without any of the surrounding HTML formatting, and this segment was pasted it into each of the other 13 financial documents. Textract was then run, which indexed the terms per document as described above, followed by a repeat of the experiment on document similarity, where the fraction of different terms was permitted to be as great as 0.5. The results are shown in Table 8.

TABLE 8

Fractional differences in terms in financial documents when a news release on supercomputers was added to each of them

| # | Original url | Fraction different with news release inserted |
|---|---|---|
| 21 | Folder1 | 0.100 |
| 38 | Reuters | 0.157 |
| 30 | Nletter | 0.06 |
| 20 | Folder | 0.117 |
| 17 | Ebus3 | 0.076 |
| 16 | Ebus1 | 0.055 |
| 35 | Retaildel | 0.096 |
| 27 | Kookmin | 0.054 |
| 4 | CRM | 0.100 |
| 1 | 24552 | 0.040 |
| 8 | Buiding | 0.040 |
| 14 | Ebusmark | 0.010 |
| 33 | RetailB | 0.015 |

It was concluded that documents of whatever size difference that had less than 20% of the terms different were likely to represent documents that were related and contained much the same text. In fact, it was found that this method identified every such document correctly and returned no false positives. In other words, the precision and recall were 100%. On the other hand, the algorithm did not identify the short IBM press release document as being related to any of the others by containment, since it was relatively short, and contained only a few salient terms.

EXAMPLE 4

In this experiment the financial document, called CRM in Table 8, was selected, and 3276 bytes of it, comprising nearly all of the non-markup text, was inserted into all of the other documents in the set. Substantially the same results as in Example 3 were obtained: 100% precision and recall as shown in Table 9.

TABLE 9

Fractional differences in terms in financial documents when a similar article was added to each of them.

| Doc number | Original url | Fraction different with CRM inserted | Fraction different between CRM added and ibmtop added |
|---|---|---|---|
| 21 | Folder1 | 0.100 | 0.050 |
| 38 | Reuters | 0.111 | 0.111 |
| 30 | Nletter | 0.064 | 0.064 |
| 20 | Folder | 0.125 | 0.125 |
| 17 | Ebus3 | 0.040 | 0.040 |
| 16 | Ebus1 | 0.055 | 0.055 |

TABLE 9-continued

Fractional differences in terms in financial documents when a similar article was added to each of them.

| Doc number | Original url | Fraction different with CRM inserted | Fraction different between CRM added and ibmtop added |
|---|---|---|---|
| 35 | Retaildel | 0.066 | 0.066 |
| 27 | Kookmin | 0.027 | 0.027 |
| 1 | 24552 | 0.080 | 0.020 |
| 8 | Building | 0.125 | 0.104 |
| 14 | Ebusmark | 0.025 | 0.020 |
| 33 | RetailB | 0.020 | 0.020 |
| 24 | Ibmtop | 0.500 | — |

Again, all of the documents with the inserted text were detected as similar to the originals and no false positives were detected. The fraction of terms that were different was 0.125 or under, except for the case where the larger CRM document was added to the smaller Ibmtop document.

In a final test, both experiments were simultaneously, and it was found that all of the similar documents were detected as before. In addition, and in an unexpected result, all of the documents with the Ibmtop text were found to be similar to the corresponding document with the inserted CRM text as well. This is shown in the fourth column of Table 9.

In these experiments the above-described Textract text mining program was run on the collection of documents (approximately 50) that were returned from the query. Low-level DB2 table load files were then generated from the Textract output and the terms/document data was then loaded into DB2. The IQ and frequency of the terms was determined from this collection. The IQ was found to change somewhat based on the contents of the documents returned. A term that was highly salient in one document set might appear too frequently to be very selective in another set. However, much of this dependence could be eliminated by simply requiring that the IQ value be non-zero. It would thus in general be possible to maintain a vocabulary for a search system with the IQs predetermined.

When all of the documents are relatively short, it is feasible to perform this processing in real time or substantially real time. However, when longer documents make the phrase mining processes too slow, it is desirable to index and mine the documents in advance and to cache the results, in a manner similar to the procedures done for document search indexes. When database comparisons of very long documents are found to run too slowly, it becomes possible to just compare the top terms, for example the top 200 terms in each document. Finally, it is quite reasonable to store the document signature as part of the database document table, to speed the comparison of documents even further.

In comparing documents for close similarity one may consider documents that are within, for example, 10% of the size of the one the documents are being compared against, and only consider documents to be similar when the number of terms that are different is less than 10% of the total number of terms in the smaller of the documents. When comparing documents that contained embedded additional material, these criteria were relaxed to 50%, with little performance penalty.

In view of the foregoing description it will be appreciated that the inventors have defined similar documents as ones that have essentially the same sentences and paragraphs, but not necessarily in exactly the same order. It has been found that one may accurately compute whether documents are similar by comparing the number of terms found using a phrase recognition program, such as Textract or similar programs. The inventors have further shown that one may accurately recognize documents that have been revised to contain parts of other documents as still being closely related to the parent document. The inventors have also shown that one may compute a document signature that can then be used to make a rapid comparison between documents that are likely to be identical.

In the course of the experiments discussed above the IQ threshold and the term frequency threshold were varied, and for various types of applications these values may be adjusted. However, it is important to note that the document signature is dependent on the number of terms retrieved, and if criteria employed for term retrieval is changed, then the document signatures are preferably recomputed.

It should be noted that when performing the database comparisons the SQL query could be speeded up if the terms are compared by an integer key rather than using a string comparison.

While these teachings have been generally presented in the context of the networked search system 100 shown in FIG. 1, it should be realized that thee teachings are not limited for use with document search and retrieval systems, but may be employed as well with other types of information retrieval systems, such as document file management systems.

Furthermore, while described above in the context of the use of a hash function to compute the document signature, other suitable techniques could be employed as well.

Thus, while described in the context of presently preferred embodiments, those skilled in the art should appreciate that changes in the form and details of these teachings may be made without deviating from the scope and spirit of this invention.

What is claimed is:

1. A method for processing data representing documents, comprising:
   for individual documents of a set of documents, executing a software program to obtain a list of terms found in each document;
   comparing the list of terms for a first document to the list of terms for a second document;
   declaring the first document to be substantially identical to, or substantially similar to, the second document if some predetermined number of terms are found in each of the lists of the first document and the second document; and
   wherein the step of comparing includes a preliminary step of sorting the documents into a document list in order of increasing size, and where the step of comparing compares the list of terms for a given document with the list of terms for the for the next larger-documents in the document list.

2. A method for processing data representing documents, comprising:
   for individual documents of a set of documents, executing a software program to obtain a list of salient terms found in each document;
   comparing the list of salient terms for a first document to the list of salient terms for a second document; and
   declaring the first document to be substantially identical to, or substantially similar to, the second document if some predetermined number of salient terms are found in each of the lists of the first document and the second document,
   wherein the comparing includes sorting the documents into a document list in order of increasing size, and where the step of comparing compares the list of salient terms for a given document with the list of salient terms for the next larger-documents in the document list.

3. A method as in claim 2, wherein if the predetermined number is 90% of the salient terms or greater the first document is declared to be substantially identical to the second document.

4. A method as in claim 2, wherein the set of documents is obtained in response to a search query made to a data communications network.

5. A method as in claim 2, and further comprising storing the lists of salient terms in a database.

6. A method as in claim 2, and further comprising computing a signature for each document, and storing the computed document signature.

7. A method as in claim 2, and further comprising computing a signature for each document, and storing the computed document signature in association with the list of salient terms for each document.

8. A method as in claim 2, wherein the step of executing a software program assigns to each salient term a collection-level importance ranking or Information Quotient (IQ), and wherein the IQ is considered during the step of comparing.

9. A method for processing data representing documents, comprising:
   for individual documents of a set of documents, executing a software program to obtain a list of terms found in each document;
   comparing the list of terms for a first document to the list of terms for a second document;
   declaring the first document to be substantially identical to, or substantially similar to, the second document if some predetermined number of terms are found in each of the lists of the first document and the second document; and
   wherein the step of comparing includes a preliminary step of sorting the documents into a document list in order of increasing size, and where the step of comparing compares the list of terms of a given document only with the list of terms of another document in the list that is no more than a predetermined amount larger than the given document.

10. A method for processing data representing documents, comprising:
    for individual ones of documents, executing a software program to obtain a list of salient terms found in each document;
    computing a document signature for each document from the list of salient terms obtained for the document;
    comparing the document signature for a first document to the document signature for a second document; and
    declaring the first document to be substantially identical to the second document if the document signatures are substantially equal,
    wherein the step of comparing includes a preliminary step of sorting the documents into a document list in order of increasing size, and where the step of comparing compares the list of salient terms of a given document with the list of salient terms of the next larger-documents in the document list.

11. A method as in claim 10, wherein the step of computing a document signature computes a hash code for each term of the list of salient terms, and then sums all of the hash codes to form the document signature.

12. A method as in claim 10, wherein the documents are obtained in response to a search query made to a data communications network, and where the steps of comparing and declaring are executed in substantially real time as the documents are returned by the query.

13. A method as in claim 10, wherein the documents are obtained in response to a search query made to a data communications network, where the steps of comparing and declaring are executed in substantially real time as the documents are received from the data communications network, and for a case where a received document is found to be substantially identical to an already received document, returning only one of the documents in response to the search query.

14. A method as in claim 10, and further comprising storing the computed document signatures in a database.

15. A method as in claim 10, and further comprising storing the computed document signature in association with the list of salient terms for each document.

16. A system for processing data representing documents comprising,
for individual documents of a set of documents, a processor that executes a software program to obtain a list of terms found in each document and compares the list of terms for a first document to the list of terms for a second document, said processor operating to declare the first document to be substantially identical to, or substantially similar to, the second document if some predetermined number of terms are found in each of the lists of the first document and the second document; and wherein said processor is further operable, before comparing the lists of terms, to sort the documents into a document list in order of increasing size, and to then compare the list of terms of a given document with the list of terms of a next larger documents in the document list.

17. A system for processing data representing documents comprising, for individual documents of a set of documents, a processor that executes a software program to obtain a list of salient terms found in each document and that compares the list of salient terms for a first document to the list of salient terms for a second document, said processor, in response to executing the software program, declaring the first document to be substantially identical to, or substantially similar to, the second document if some predetermined number of salient terms are found in each of the lists of the first document and the second document, wherein said comparing includes sorting the documents into a document list in order of increasing size, and where said comparing compares the list of salient terms for a given document with the the list of salient terms for the next larger-documents in the document list.

18. A system as in claim 17, wherein if the predetermined number is 90% of the salient terms or greater the first document is declared to be substantially identical to the second document.

19. A system as in claim 17, wherein the set of documents is obtained in response to a search query made to a data communications network.

20. A system as in claim 17, and further comprising a memory containing a database for storing the lists of salient terms.

21. A system as in claim 17, said processor being further operable for computing a signature for each document, and further comprising a memory for storing the computed document signature.

22. A system as in claim 17, said processor being further operable for computing a signature for each document, and further comprising a memory for storing the computed document signature in association with the list of salient terms for each document.

23. A system as in claim 17, wherein said processor, when executing the software program, assigns to each term a collection-level importance ranking or Information Quotient (IQ), and wherein the IQ is considered by said processor when comparing the list of salient terms for the first document to the list of salient terms for the second document.

24. A system for processing data representing documents comprising,
for individual documents of a set of documents, a processor that executes a software program to obtain a list of terms found in each document and compares the list of terms for a first document to the list of terms for a second document, said processor, in response to executing the software program, declaring the first document to be substantially identical to, or substantially similar to, the second document if some predetermined number of terms are found in each of the lists of the first document and the second document; and wherein said processor, before comparing the lists of terms, sorts the documents into a document list in order of increasing size, and compares the list of terms for a given document only with the list of terms for another document in the list that is no more than a predetermined amount larger than the given document.

25. A system for processing data representing documents, comprising, for individual documents of a set of documents, a processor that executes a software program to obtain a list of salient terms found in each document, computes a document signature for each document from the list of salient terms obtained for the document; compares the document signature for a first document to the document signature for a second document; and declares the first document to be substantially identical to the second document if the document signatures are equal, wherein said comparing includes sorting the documents into a document list in order of increasing size, and where said comparing compares the list of salient terms for a given document with the list of salient terms for the next larger-documents in the document list.

26. A system as in claim 25, wherein said processor computes the document signature by computing a hash code for each salient term of the list of salient terms, and summing all of the hash codes to form the document signature.

27. A system as in claim 25, wherein the documents are obtained in response to a search query made to a data communications network, and where the processor executes the comparing and declaring functions in substantially real time as the documents are returned by the query.

28. A system as in claim 25, wherein the documents are obtained in response to a search query made to a data communications network, where the processor executes comparing and declaring functions in substantially real time as the documents are received from the data communications network, and for a case where a received document is found to be substantially identical to an already received document, said processor returns only one of the documents in response to the search query.

29. A system as in claim 25, and further comprising a memory containing a database for storing the computed document signatures.

30. A system as in claim 29, and further comprising storing the computed document signature in association with the list of terms for each document.

31. A computer program recorded on a computer-readable media, said computer program comprising instructions for directing a data processor to process data representing documents by, for individual documents of a set of documents, obtaining a list of salient terms found in each document; comparing the list of salient terms for a first document to the list of salient terms for a second document; and declaring the first document to be substantially identical to, or substantially similar to, the second document if some predetermined number of salient terms are found in each of the lists of the first document and the second document, wherein said comparing includes sorting the documents into a document list in order of increasing size, and where said comparing compares the list of salient terms for a given document with the list of salient terms for the next larger-documents in the document list.

32. A computer program recorded on a computer-readable media, said computer program comprising instructions for directing a data processor to process data representing documents by, for individual ones of documents, obtaining a list of salient terms found in each document; computing a document signature for each document from the list of salient terms obtained for the document; comparing the document signature for a first document to the document signature for a second document; and declaring the first document to be substantially identical to the second document if the document signatures are equal, wherein said comparing includes sorting the documents into a document list in order of increasing size, and where said comparing compares the list of salient terms for a given document with the list of salient terms for the next larger-documents in the document list.

33. A computer program as in claim 32, wherein the document signature is computed by computing a hash code for each salient term of the list of salient terms, and summing together all of the hash codes to form the document signature.

\* \* \* \* \*